(12) United States Patent
Whitney

(10) Patent No.: US 7,384,173 B2
(45) Date of Patent: Jun. 10, 2008

(54) BRIGHTNESS ENHANCEMENT ARTICLE

(75) Inventor: Leland R. Whitney, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 63 days.

(21) Appl. No.: 11/027,172

(22) Filed: Dec. 30, 2004

(65) Prior Publication Data

US 2006/0146571 A1 Jul. 6, 2006

(51) Int. Cl.
*F21V 5/00* (2006.01)

(52) U.S. Cl. .................... 362/330; 349/65; 362/620

(58) Field of Classification Search .............. 362/330, 362/339, 606–610, 615–628; 385/145; 353/33; 359/619, 485–486, 494–496; 349/61–65
See application file for complete search history.

(56) References Cited

U.S. PATENT DOCUMENTS

| | | | | |
|---|---|---|---|---|
| 4,127,693 A | * | 11/1978 | Lemelson | 428/163 |
| 4,906,070 A | | 3/1990 | Cobb, Jr. et al. | |
| 5,056,892 A | * | 10/1991 | Cobb, Jr. | 359/831 |
| 5,243,506 A | * | 9/1993 | Whitehead | 362/307 |
| 5,704,703 A | * | 1/1998 | Yamada et al. | 362/27 |
| 5,771,328 A | * | 6/1998 | Wortman et al. | 385/146 |
| 5,851,062 A | * | 12/1998 | Shinohara et al. | 362/620 |
| 5,889,615 A | * | 3/1999 | Dreyer et al. | 359/529 |
| 5,919,551 A | | 7/1999 | Cobb, Jr. et al. | |
| 6,280,063 B1 | * | 8/2001 | Fong et al. | 362/333 |
| 6,347,874 B1 | * | 2/2002 | Boyd et al. | 362/628 |
| 6,456,437 B1 | * | 9/2002 | Lea et al. | 359/625 |
| 6,478,438 B1 | * | 11/2002 | Ishikawa et al. | 362/620 |
| 6,707,611 B2 | * | 3/2004 | Gardiner et al. | 359/619 |
| 6,876,408 B2 | | 4/2005 | Yamaguchi | |
| 7,142,767 B2 | * | 11/2006 | Gardiner | 385/146 |
| 2002/0097496 A1 | * | 7/2002 | Lu | 359/628 |
| 2005/0147374 A1 | * | 7/2005 | Gardiner | 385/146 |

FOREIGN PATENT DOCUMENTS

WO WO 2004/061536 7/2004

* cited by examiner

*Primary Examiner*—John Anthony Ward

(57) ABSTRACT

A brightness enhancement article for use in an optical system is disclosed. The brightness enhancement article has a structured surface including light directing protrusions. The light directing protrusions include a peak and a base, the peak having a rounded contour defined by a first pair of prism facets and the base defined by a second pair of prism facets. The first pair of prism facets has a first included angle and the second pair of prism facets has a second included angle, such that the first included angle is different than the second included angle.

19 Claims, 7 Drawing Sheets

BRIGHTNESS ENHANCEMENT ARTICLE

BACKGROUND OF THE INVENTION

The present invention relates to structured optical films and optical displays incorporating the structured optical films. More specifically, the present invention relates to a brightness enhancement film with reduced glancing angle output.

Electronic devices that include electronic displays for conveying information to a viewer have become nearly ubiquitous. Mobile phones, handheld computers, personal digital assistants, electronic games, car stereos and indicators, public displays, automated teller machines, in-store kiosks, home appliances, computer monitors, televisions, etc., are all examples of devices that include displays that people view on a daily basis.

The typical electronic display assembly contains a light source that is required in order for people to observe the information presented by the display. In battery powered equipment, the light source can represent a substantial fraction of the total power draw of the equipment. Therefore, reducing the amount of power required to produce a given luminance increases battery life, which is especially desirable in battery powered equipment.

Structured optical films are used in electronic display systems and in other applications where control over the direction of light, transmitted and/or reflected, is desired to increase brightness, reduce glare, etc. A structured optical film essentially comprises films of light transmissible materials in which a series of prisms are located such that the films can be used to redirect light through reflection and refraction. When used in an optical display such as that found in laptop computers, watches, etc., the structured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the structured film at an angle that allows it to escape from the display. That recycling is useful because it can reduce power consumption needed to provide a display with a desired level of brightness.

In conventional structured optical films, some light is allowed to exit the display outside the allowable range of angles relative to the normal axis running through the display. These high angle light rays may reduce the contrast of the display (the difference in brightness between light and dark areas of the display) and produce undesirable areas of brightness outside of a preferred viewing angle. It would be desirable to recycle these high angle light rays and return them back to the structured film for retransmission within the range of desired angles.

BRIEF SUMMARY OF THE INVENTION

The present invention is a brightness enhancement article for use in an optical system. The brightness enhancement article has a structured surface including first light directing protrusions. The first light directing protrusions include a peak and a base, the peak defined by a first pair of prism facets and the base defined by a second pair of prism facets. The first pair of prism facets has a first included angle and the second pair of prism facets has a second included angle, such that the first included angle is different than the second included angle.

In a preferred embodiment, the brightness enhancement article further includes a plurality of second light directing protrusions of lesser height than the first light directing protrusions. The second light directing protrusions are interleaved with the first light directing protrusions. The second light directing protrusions produce a light distribution having high angle lobes and lobes at preferred angles relative to a normal to the structured surface. The light distributed by the second light directing protrusions in the high angle lobes is redirected by the first light directing protrusions for retransmission at a preferred angle.

Preferably, the first included angle of the first light directing protrusions is greater than 90° and the second included angle of the second light directing protrusions is about 90°. Furthermore, the peak of the first light directing protrusions preferably has a rounded peak having a radius of curvature of less than about 10.5 μm. Also, at least one second light directing protrusion is positioned between adjacent first light directing protrusions.

The brightness enhancement article of the present invention is typically incorporated in a display module. The display module typically includes a display panel and a backlight assembly for providing light to the display panel. The brightness enhancement article is located between the backlight assembly and the display panel, with the structured surface facing the display panel.

DETAILED DESCRIPTION

Figure 1A:
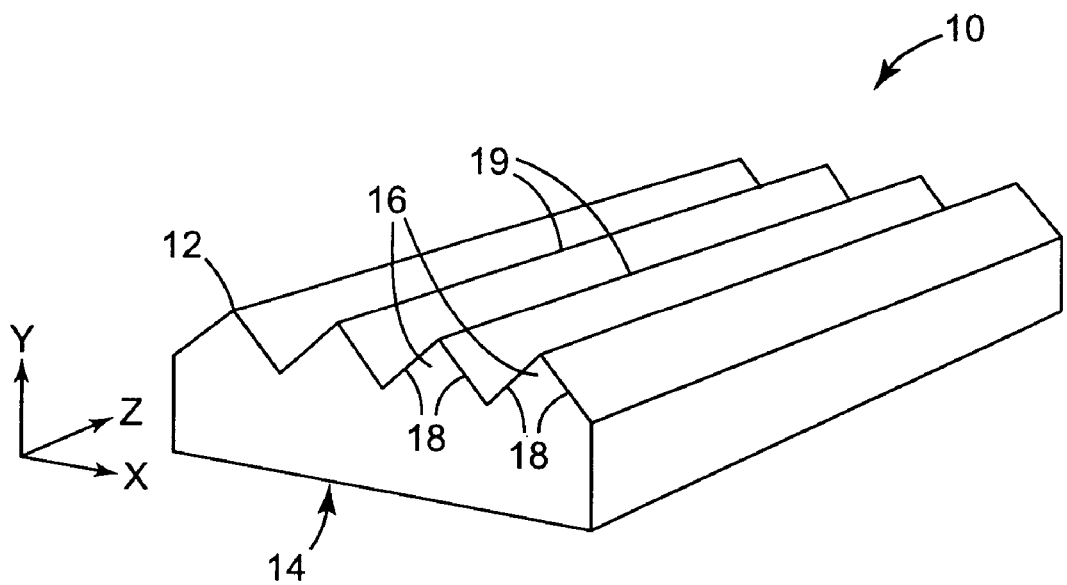
FIG. 1A is a perspective view of a conventional structured optical film.
Figure 1B:
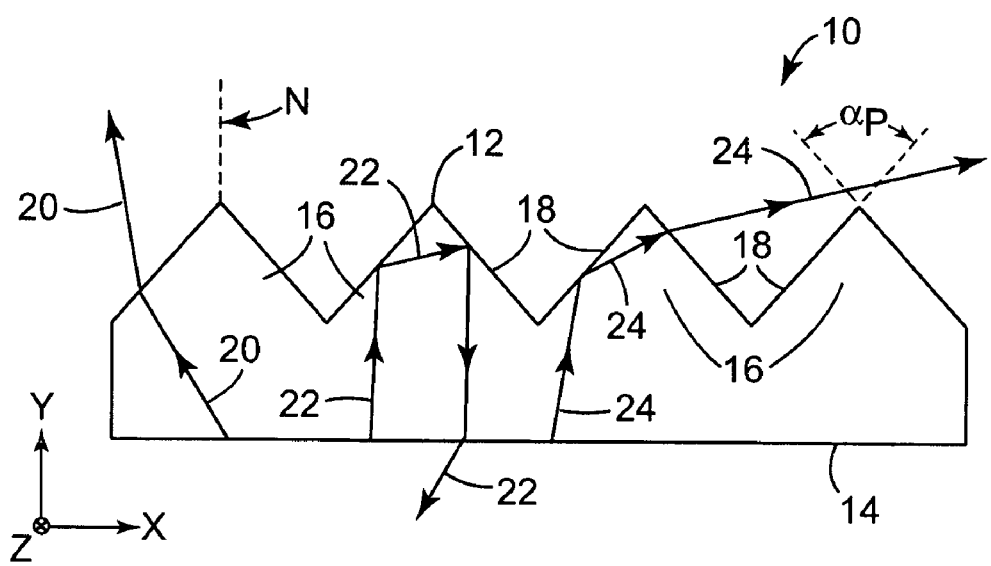
FIG. 1B is a cross-section view of the conventional structured optical film of FIG. 1A.

FIGS. 1A and 1B generally illustrate the concept of structured optical films. FIG. 1A shows a perspective view and FIG. 1B shows a cross-section view of a regular, periodic structured optical film 10 including structured surface 12 and planar surface 14. Structured surface 12 includes a series of regularly spaced prisms 16 defined by facets 18 which form peaks 19. Prisms 16 have an included angle $\alpha_P$ (that is, the angle formed by facets 18). Typically, $\alpha_P$ is 90°, which allows for high optical gain. As can be seen, each prism 16 extends substantially uninterrupted across the structured surface along the length of its peak 19 (i.e., along the Z-axis).

Optical film 10 is typically incorporated into an optical system including a backlight assembly which provides light to optical film 10. Light rays 20, 22, and 24 are shown in FIG. 1 to depict the behavior of light entering optical film 10 at various angles. Light rays 20 and 22 are shown in FIG. 1B to depict the desired operation of a structured optical film. Light ray 20, which is shown after entering optical film 10 via refraction through planar surface 14, depicts the situation in which a light ray contacts a facet 18 of prism 16 below the critical angle required for TIR. Light ray 20 is refracted through the facet within the preferred range of angles relative to film normal N.

Light ray 22, which also is shown after entering optical film 10 via refraction through planar surface 14, depicts the situation in which a light ray strikes the two facets 18 of a prism 16 above the critical angle required for TIR of the light ray to occur. As a result, light ray 22, which would have exited structured optical film 10 outside of the preferred range of angles, is reflected back toward the backlight assembly where a portion of it can be "recycled" and returned back to the structured film at an angle that allows it to escape from structured optical film 10.

With conventional structured optical film designs, some light is allowed to escape from prisms 16 at high glancing angles. This situation is depicted by light ray 24. The escape of light usually occurs when light ray 24 is reflected by TIR from a first facet to a second facet of a prism 16, and light ray 24 contacts the second facet below the critical angle required for TIR of light ray 24 by the second facet. The second facet consequently refracts light ray 24, which escapes structured optical film 10 outside of the preferred range of angles. These high angle light rays may reduce the contrast of the display and produce undesirable areas of brightness outside of the preferred viewing angles of the display (e.g., within 30° of optical film normal N).

The present invention, described in connection with the illustrative embodiments depicted in FIG. 2A and the following figures, provides a structured optical film wherein these high angle (e.g., angles greater than 60°) light rays are recaptured and redirected back toward the backlight assembly where a portion can be "recycled" and returned back to the structured film at an angle that allows it to escape from structured optical film at a more desirable angle. This can improve contrast and increase brightness of the display at preferred viewing angles.

Figure 2A:
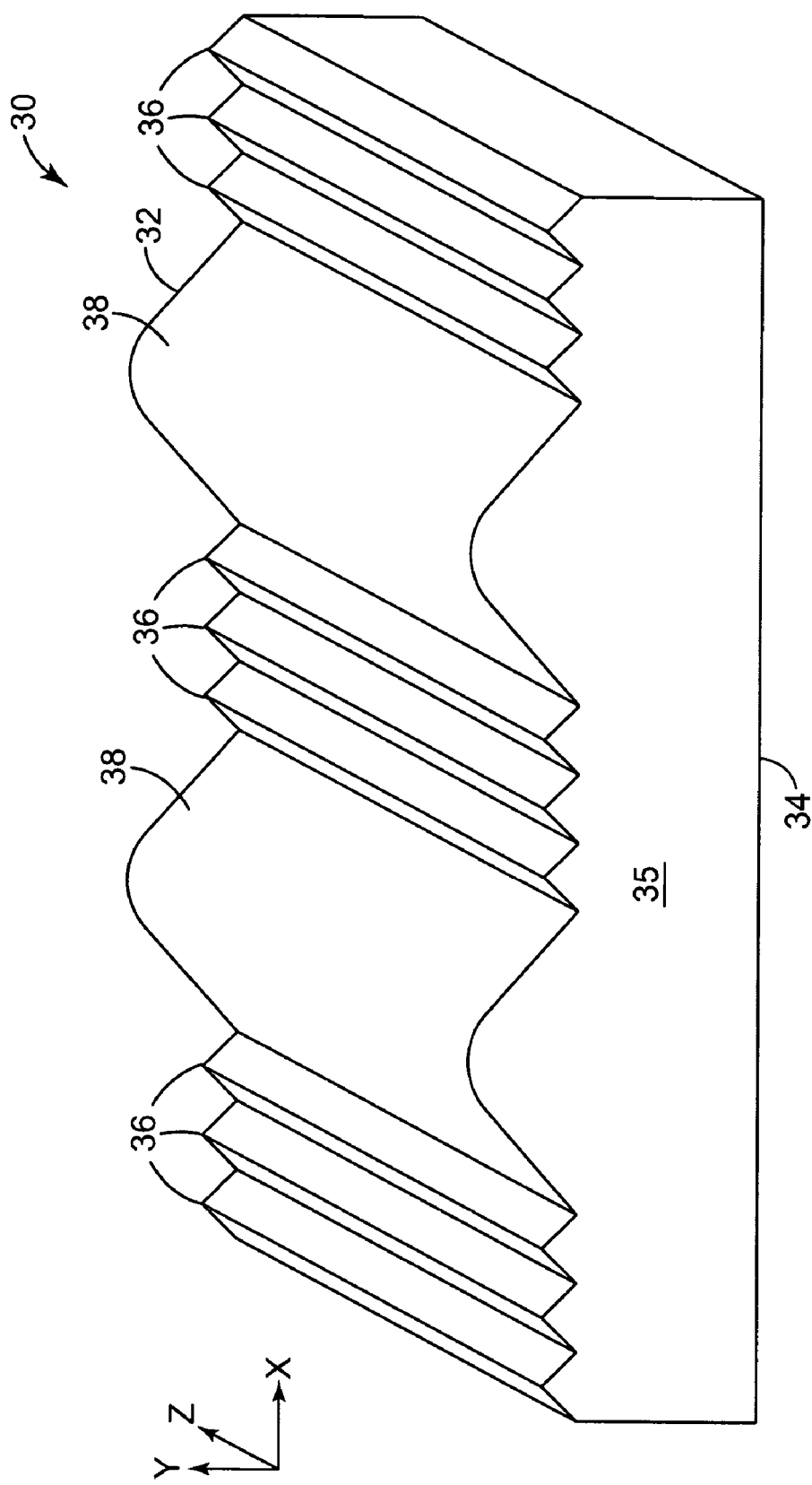
FIG. 2A is a perspective view of a structured optical film according to the present invention.
Figure 2B:
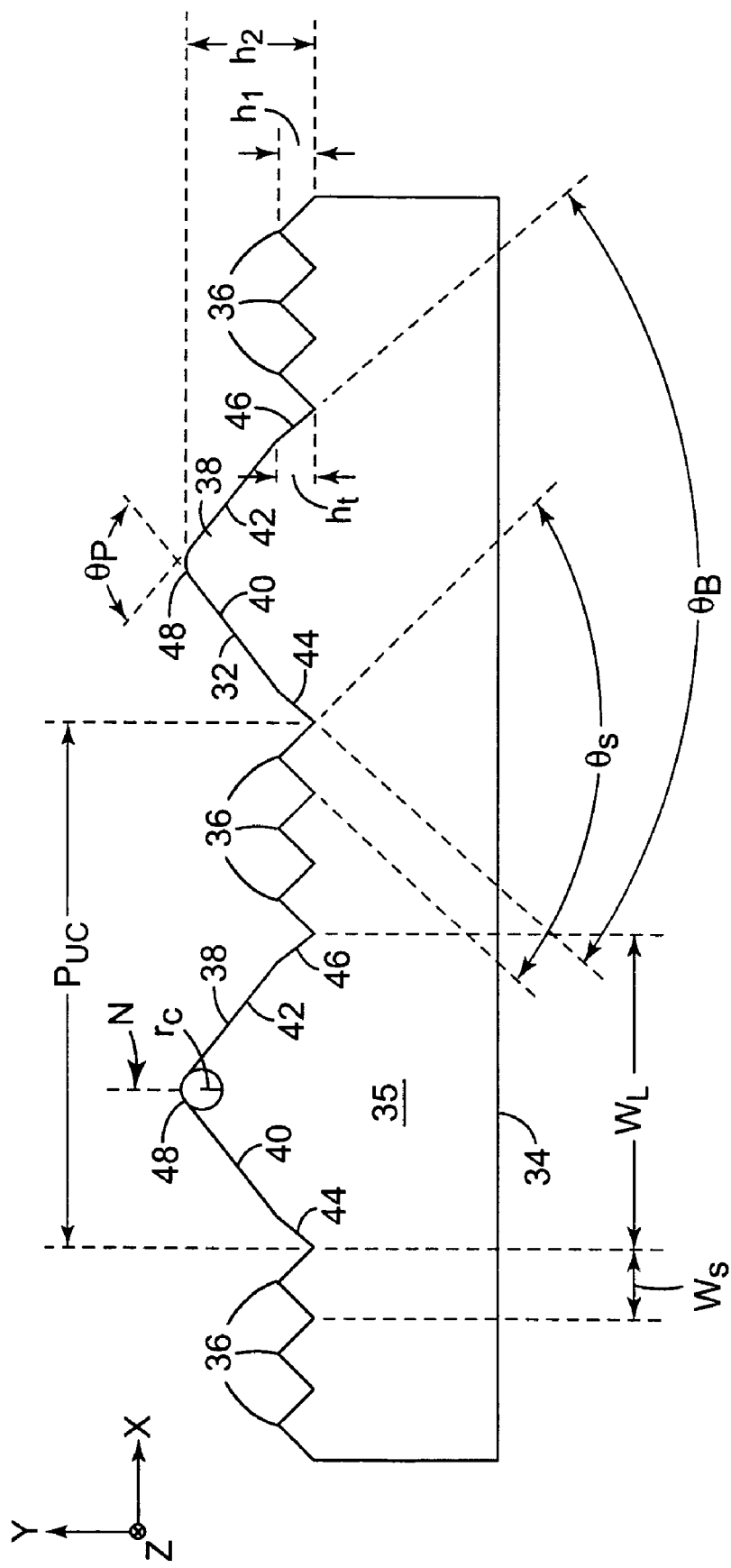
FIG. 2B is a partial cross-section view of the structured optical film of FIG. 2A, showing various parameters of the structured optical film.
Figure 2C:
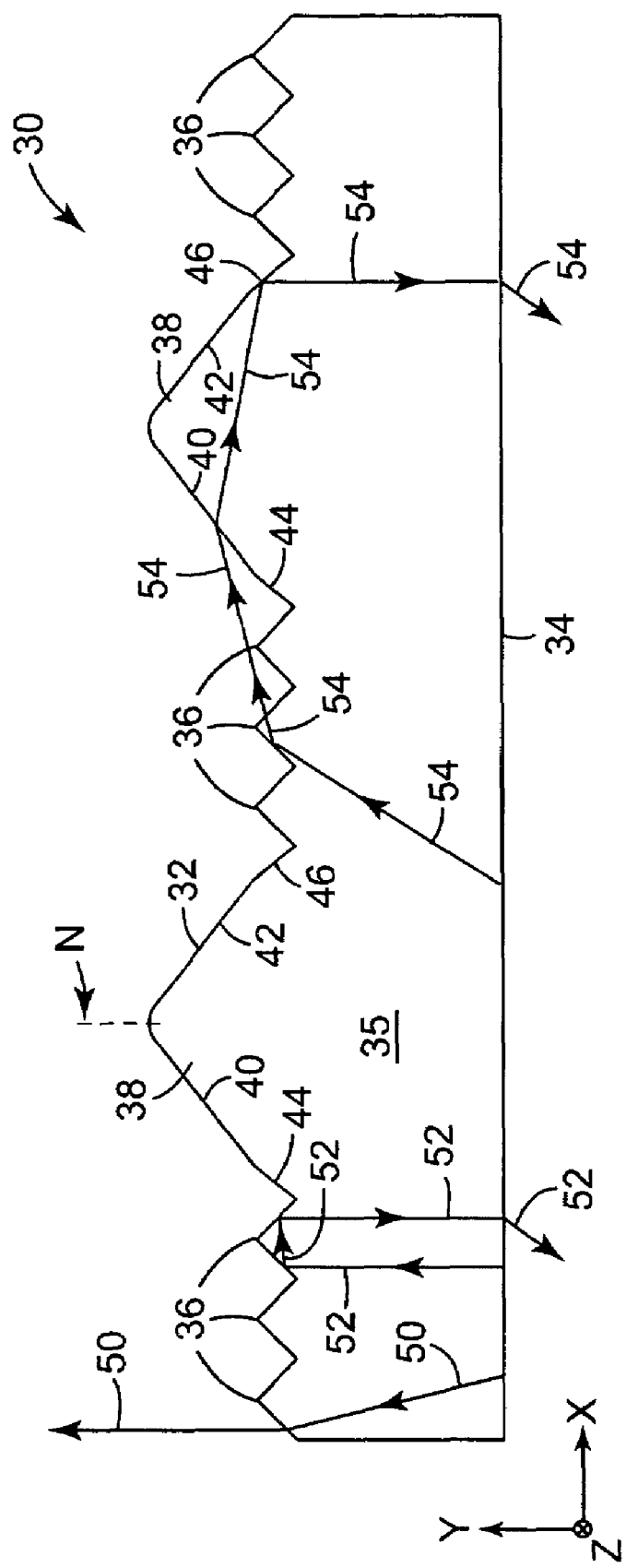
FIG. 2C is a partial cross-section view of the structured optical film of FIG. 2A, showing the behavior of light rays entering the structured optical film at various angles.

FIG. 2A is a perspective view and FIGS. 2B and 2C are partial cross-section views of structured optical film 30 according to an embodiment of the present invention. Structured optical film 30 includes structured surface 32 and planar surface 34. Structured surface 32 is formed on and planar surface 34 is defined by substrate 35. Structured surface 32 includes a plurality of prisms 36 and a plurality of prisms 38 arranged in a periodic pattern. As can be seen in FIG. 2A, prisms 36 and 38 extend substantially uninterrupted across structured surface 32 along the length of their peak (i.e., along the Z-axis). The geometry of structured surface 32 and the material used to manufacture film 30 foster total internal reflection (TIR) and refraction of light entering planar side 34 of film 30 and light transmitted from structured surface 32 at high glancing angles to minimize the escape of light through the structured surface outside of a desired range of angles relative to film normal N.

FIG. 2B is a partial cross-section view of structured optical film 30, showing various parameters of structured optical film 30. Prisms 36 have a first height $h_1$ and prisms 38 have a second height $h_2$ greater than first height $h_1$ ($h_2 > h_1$). Preferably, first height $h_1$ is less than 30% height $h_2$. First height $h_1$ is preferably in the range of about 5 μm to about 20 μm, and second height $h_2$ is preferably in the range of about 20 μm to about 50 μm. Preferably $h_1$ and $h_2$ are chosen such that a light ray escaping from the peak of a prism 36 at an angle of 75° from the normal to the film will be intercepted by one of the prisms 38. It is expected that $h_2$ would generally be at least one and a half times as great as $h_1$ although smaller ratios may work depending on design of structured surface 32. Preferably $h_2$ is at least twice as great as $h_1$ and even more preferably $h_2$ is at least three times as great as $h_1$. For cosmetic reasons, prisms 36 should be at least large enough that diffractive effects do not introduce undesirable color and prisms 38 should not be large enough to be visible to a user through the lcd panel with which the film is used.

Each prism 36 includes two facets which define an included angle $\theta_S$. Included angle $\theta_S$ is preferably about 90°, which allows for maximum optical gain from light supplied by the backlight assembly. "Gain" refers to the ratio of the on-axis brightness (that is, the brightness in a direction normal to the display) of a backlit display equipped with a brightness enhancing film to the perpendicular brightness of the display in the absence of the film.

Prisms 38 preferably include a peak and a base. The peak of prisms 38 is defined by a first pair of peak facets 40 and 42, which has an included angle $\theta_P$ (that is, the angle formed by peak facets 40 and 42). Included angle $\theta_P$ is preferably in the range of about 70° to about 110°. The base of prisms 38 is defined by a second pair of base facets 44 and 46, which has included angle of $\theta_B$ (that is, the angle at which base facets 44 and 46 are positioned with respect to each other). Included angle $\theta_B$ is preferably about 90°.

The peak and the base of each prism 38 are preferably integral with each other. Prisms 38 have a truncation height ht, which is the height at which the base facets 44 and 46 meet peak facets 40 and 42. Preferably, truncation height ht and height $h_1$ of prisms 36 are substantially similar. Furthermore, prisms 38 have width $w_L$ and prisms 36 have a width $w_S$. As shown in FIG. 2B, width $w_L$ is larger than width $w_S$ ($w_L > w_S$). Preferably, width $w_S$ is less than 30% width $w_L$. Width $w_S$ is preferably in the range of 10 μm to about 40 μm, and width $w_L$ is preferably in the range of about 40 μm to about 100 μm. Unit cell pitch $P_{UC}$ is the width of a repeating unit of prisms (i.e., a unit cell) in optical film 30. In the embodiment shown in FIG. 2B, a unit cell includes three prisms 36 and one prism 38.

Peak facets 40 and 42 of prisms 38 meet to form peak tip 48. Peak tip 48 is shown in FIGS. 2A-2C having a rounded or blunted contour. The rounded contour is characterized by radius of curvature $r_C$. Radius of curvature $r_C$ is preferably less than 10.5 μm, and most preferably radius of curvature $r_C$ is about 6 μm. While rounding peak tips 48 results in a decrease of gain in prisms 38, scratching caused by breaking or marring of peak tips 48 during handling and use is prevented. Furthermore, because prisms 38 are taller than prisms 36, the peaks of prisms 36 are protected from damage during handling and use. This allows prisms 36 to have sharp peaks to maximize gain of prisms 36. Alternatively, if scratching optical film 30 can be avoided, prisms 38 may have sharp peak tips 48 (i.e., radius of curvature $r_C$ of zero) to maximize gain of prisms 38.

FIG. 2C is a partial cross-section view of structured optical film 30, showing the behavior of light rays entering the structured optical film at various angles. Optical film 30 is typically incorporated into an optical system including a backlight assembly which provides light to optical film 30. Light rays 50, 52, and 54 are shown in FIG. 2C to depict the behavior of light entering optical film 30 at various angles.

Light ray 50, which is shown after entering optical film 30 via refraction through planar surface 34, depicts the situation in which a light ray reaches prism 16 below the critical angle required for TIR. Light ray 50 is refracted through the facet within the preferred range of angles relative to film normal N.

Light ray 52, which also is shown after entering optical film 30 via refraction through planar surface 34, depicts the situation in which a light ray prism 16 above the critical angle required for TIR of the light ray to occur. As a result, light ray 50, which would have exited structured optical film 30 outside of the preferred range of angles, is reflected back toward the backlight assembly where a portion of it can be "recycled" and returned back to the structured film at an angle that allows it to escape from structured optical film 30.

Light ray 54 is shown after entering structured optical film 30 via refraction through planar surface 34 and depicts the situation in which a light ray is allowed to escape from prisms 36 at high glancing angles. This is the undesirable situation described with regard to light ray 24 of FIG. 1B. To recapitulate, light ray 54 is reflected by TIR from a first facet to a second facet of a prism 36. Light ray 54 contacts the second facet below the critical angle required for TIR of light ray 54 by the second facet. The second facet consequently refracts light ray 54, which escapes structured optical film 30 outside of the desired range of angles.

In structured optical film 30 according to the present invention, high angle light rays are reduced in two regards. First, high angle light rays transmitted by prisms 36 (e.g., light ray 54) are recaptured by prisms 38. That is, each prism 38 is shaped such that light distributed in high angle lobes by prisms 36 is captured and redirected by prism 38 to be eventually reflected back toward the backlight assembly. Light ray 54 is reflected via TIR by the various surfaces of optical film 30 until it reaches the backlight assembly. Second, prisms 38 have included angles $\theta_P$ and $\theta_B$ such that light rays that reach prisms 38 directly from the backlight assembly at undesirable angles are more likely to be reflected via TIR back toward the backlight assembly, rather than being transmitted from optical film 30 at a high glancing angle. In both cases, upon reaching the backlight assembly a portion of the light is "recycled" and returned back to structured film 30 at an angle that allows it to escape from structured optical film 30 at a more desirable angle.

In order to facilitate the recapture and recycling of light distributed by prisms 36 in high angle lobes, angle $\theta_P$ formed by facets 40 and 42 is preferably in the range of about 70° to about 110°, and more preferably in the range of about 90° to about 110° (with an angle of about 96° most preferred). Facets 40 and 42 positioned at these preferred angles with respect to each other produce the greatest likelihood of recapture of high angle light rays. Furthermore, facets 40 and 42 are positioned at these preferred angles to minimize escape of light rays from prisms 38 in high angle lobes. In optical film 30 according to the present invention, intensity of light at angles greater than 75° from normal N is substantially eliminated. In particular, in a system including optical film 30 according to the present invention, light intensity at angles greater than about 75° from normal N are less than about 10% the light intensity along normal N.

The periodic pattern of prisms 36 and 38 (i.e., the unit cell configuration) as shown in FIGS. 2A-2C is merely exemplary, and other patterns may be used. For example, fewer or more prisms 36 may be positioned between prisms 38. While fewer high angle rays are captured with the additional space (i.e., additional prisms 36) between prisms 38, additional prisms 36 allow for an increase in gain, since prisms 36 are shaped to maximize gain. In general, larger prisms 38 are interspersed at regular intervals with smaller prisms 36.

Figure 3:
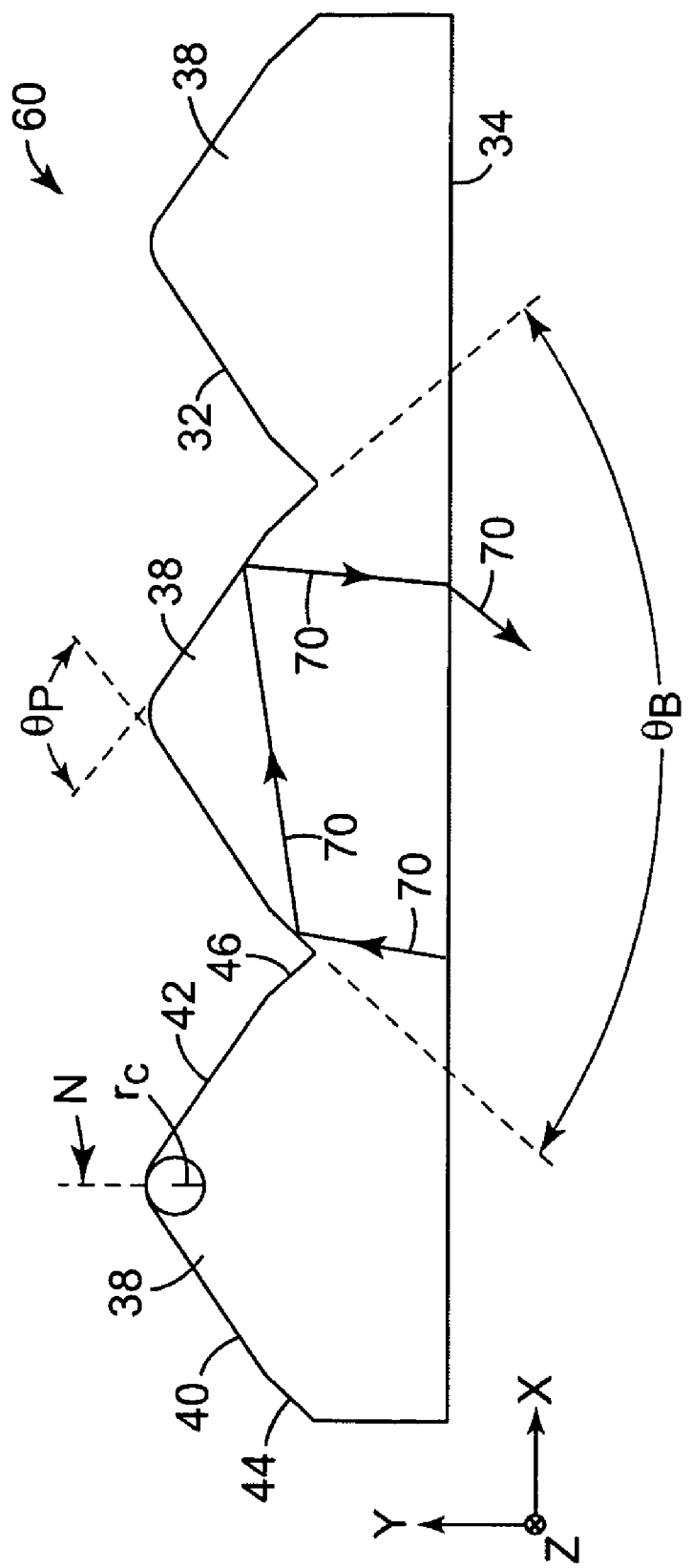
FIG. 3 is a partial cross-section view of a structured optical film according to another embodiment of the present invention.

It is also important to note that optical film 30 may include only large prisms 38 (that is, no small prisms 36 interspersed between large prisms 38) for a reduction in high angle light rays over conventional films. This is because prisms 38 themselves are shaped to reduce distribution of light rays in high angle lobes. This embodiment is depicted in FIG. 3 as optical film 60. In general, the parameters described with regard to prisms 38 in optical film 30 are applicable to prisms 38 in optical film 60. However, for this embodiment, included angle $\theta_P$ is preferably greater than 90° (with an angle of about 96° most preferred), to produce a reduction in high angle light rays over conventional films. FIG. 3 also shows light ray 70 reaching prism 38 at an undesirable angle and being reflected via TIR back toward the backlight assembly, rather than being transmitted from optical film 60 at a high glancing angle.

Furthermore it is not necessary that all of prisms 38 be the same height or that all of prisms 36 be the same height. For various reasons these heights may be varied. However, in order to maximize the effectiveness of the film in enhancing brightness, it is preferred that there be no land spaces between the prisms regardless of whether they are all of the same height or have multiple heights. While it is understood that, at some level of magnification, the valleys between the prisms will be flat or rounded, the term "no land" shall be understood to mean that the valleys are reasonably sharp corners in view of standard machining and molding techniques.

It should also be noted that various parameters of prisms 36 and 38 may be adjusted without departing from the spirit and scope of the present invention. For example, first height $h_1$ of prisms 36 and second height $h_2$ of prisms 38 may be adjusted as system requirements and specifications dictate to adjust gain and recapture of high angle rays. Also, first height $h_1$ of prisms 36 and second height $h_2$ of prisms 38 may be varied along the length of their peaks (i.e., along the Z-axis). Furthermore, prisms 36 and 38 are shown in FIGS. 2A-2C and 3 with generally planar facets, but it will be understood that the present invention includes structured optical films having prisms and facets formed in any optically useful shape. For example, prisms 36 or 38 may include variations such as rounded valleys, curved facets, etc. In other words, the present invention is useful with any structured optical film that reduces light distributed in high angle lobes by recapturing and redirecting light for retransmission at more desirable angles.

Although the particular material used to manufacture structured optical films according to the present invention may vary, it is important that the material be substantially transparent to ensure high optical transmission. Useful polymeric materials for this purpose are commercially available such as, for example, acrylics, polycarbonates, acrylate, polyester, polypropylene, polystyrene, polyvinyl chloride, and the like. While the particular material is not critical, materials having higher indices of refraction will generally be preferred. More specifically, materials having indices of refraction greater than 1.5 are most preferable. Useful materials for forming structured optical films are discussed in U.S. Pat. No. 5,175,030 (Lu et al.) and U.S. Pat. No. 5,183,597 (Lu).

Figure 4:
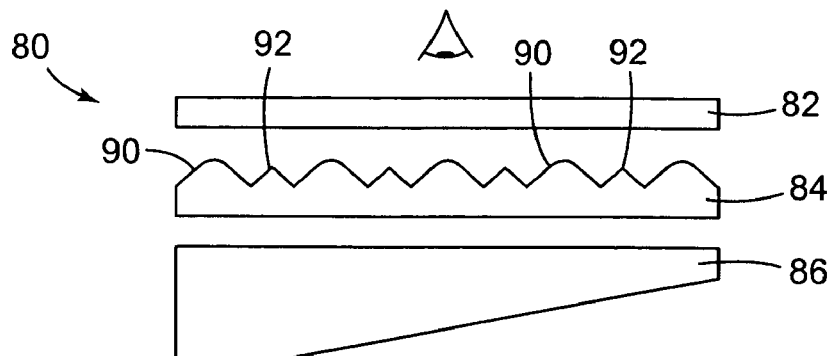
FIG. 4 is a cross-section view of an optical display assembly incorporating a structured optical film according to the present invention.

FIG. 4 illustrates one application in which a layer of structured optical film according to the present invention can be advantageously used. The application is a backlit optical display assembly 80. Optical display assembly 80 includes a display panel 82 and structured optical film 84 according to the present invention. Optical display assembly 80 also includes backlight assembly 86 for use in those situations in which ambient light is insufficient to view display panel 84. Backlight assembly 86 is preferably generally wedge-shaped or slab-shaped, but it should be noted that any shape or type of backlight source may be used in place of the backlight assembly pictured including, but not limited to, a direct-lit type assembly (e.g., a direct-lit liquid crystal display (LCD) television), a surface-emission type assembly, a flat edge-lit type assembly, and so on. Backlight assembly 86 may be optically coupled to, or integral with, structured optical film 84. Furthermore, optical display assembly 80 is shown in its simplest form, and additional optically useful layers may be incorporated into optical display assembly 80 between display panel 82 and structured optical film 84, between structured optical film 84 and backlight assembly 86, and below backlight assembly 86. Examples of such optically useful layers include, but are not limited to, reflective polarizers, diffusers, cover sheets, and reflector layers. These optically useful layers may be optically coupled to, or integral with, structured optical film 84.

Structured optical film 84 is a conceptual representation of any of the embodiments of the present invention (or variations thereof) heretofore described with regard to FIGS. 2A-2C and 3. Structured optical film 84 is preferably positioned between display panel 82 and backlight assembly 86 with the structured surface facing display panel 82 and the planar surface facing backlight assembly 86. The larger light directing protrusions 90 of structured optical film 84 redirect light distributed by smaller light directing protrusions 92 in high angle lobes back toward backlight assembly 86. Furthermore, the larger light directing protrusions themselves are shaped to reduce distribution of light rays in high angle lobes. The redirected light is then "recycled" when it is reflected by backlight assembly 86 toward structured optical film 84 for retransmission to display panel 82 at a more desirable angle. This can improve contrast and increase brightness of the display at preferred viewing angles as a consequence of reducing high angle outputs of the shorter light directing protrusions.

Figure 5:
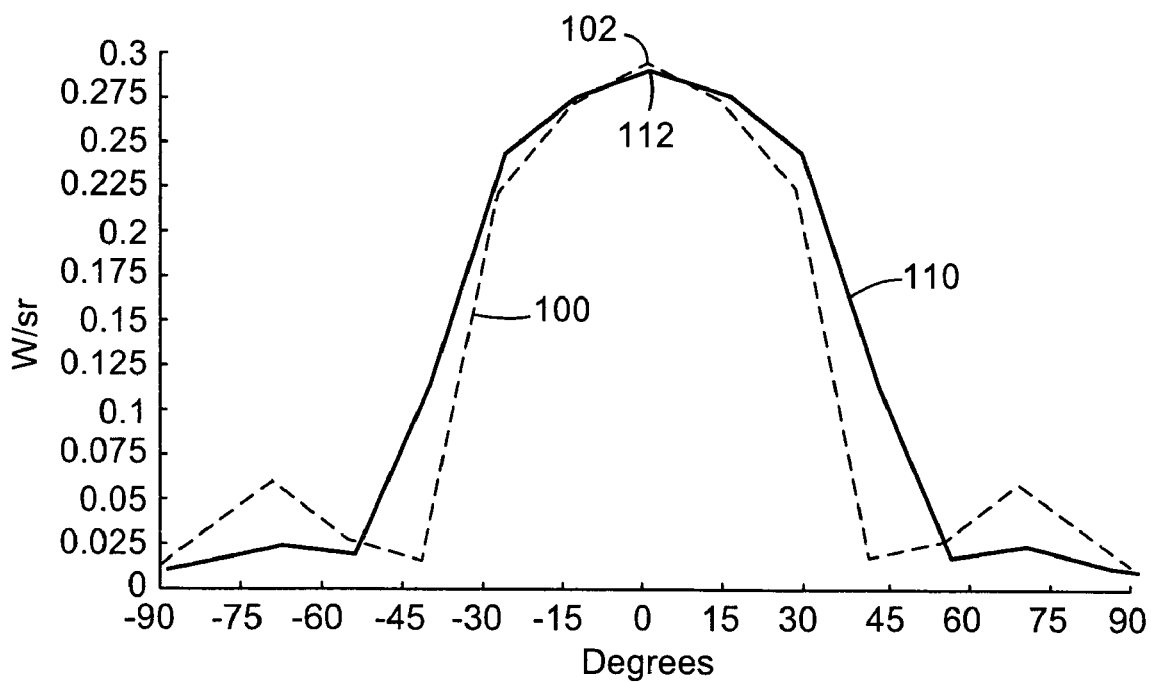
FIG. 5 is a luminous intensity distribution plot for the conventional structured optical film of FIGS. 1A and 1B, and for the structured optical film according to the present invention shown in FIGS. 2A-2C.

FIG. 5 shows luminous intensity distribution plot 100 for conventional structured optical film 10 (as shown in FIGS. 1A and 1B) and luminous intensity distribution plot 110 for structured optical film 30 according to the present invention (as shown in FIGS. 2A-2C). Luminous intensity distribution plots 100 and 110 plot various angles relative to film normal N versus the radiant intensity at these angles in Watts/steradian (W/sr). For the various angles along the horizontal axis in FIG. 5, 0° is along film normal N (i.e., along the Y-axis in FIGS. 1A, 1B, and 2A-2C), and ±90° is perpendicular to film normal N (i.e., along the X-axis in FIGS. 1A, 1B, and 2A-2C). The radiant intensity for the plots in FIG. 5 is calculated in a system substantially similar to that shown in FIG. 4, wherein backlight assembly 86 provides a distribution of light and wherewith a radiant intensity detector is positioned on a side opposite of display panel 82 from structured optical film 84. The plots represent the calculated radiant intensity of light along the XY-plane in FIGS. 1A, 1B, in 2A-2C at various angles relative to film normal N.

Luminous intensity distribution plot 100 is shown for structured optical film 10, wherein prisms 16 have an included angle $\theta_S$ of 90°. As shown by plot 100, peak radiant intensity 102 occurs at 0°, or, along normal N of optical film 10. At increasing angles from optical film normal N, the radiant intensity decreases until around ±45 from normal N. At this point, light distributed by optical film 10 in high angle lobes (e.g., light ray 24 in FIG. 1B) produces areas of increased light intensity outside of preferred viewing angles. As shown by plot 100, the increased radiant intensity occurs at angles between about ±45° to ±90°. The high radiant intensity at these high angles may reduce the contrast of the display and produce undesirable areas of brightness outside of a preferred viewing angle of the display. Furthermore, the high angle lobes reduce the light intensity within the preferred viewing angles, since these rays escape structured optical film 10 without being recycled and retransmitted at a preferred viewing angle.

Luminous intensity distribution plot 110 is shown for structured optical film 30 according to the present invention. Plot 110 is for structured optical film 30 including configuration parameters as follows: included angle $\theta_P$ of 96°, included angles $\theta_B$ and $\theta_S$ of 90°, and radius of curvature $r_C$ of 6 µm. As shown by plot 110, peak radiant intensity 112 also occurs at 0°, or, along normal N of optical film 30. At increasing angles from optical film normal N, the radiant intensity decreases until about −55° and 55° from normal N. At this point, the radiant intensity at increasing angles from normal N is substantially constant. A small region of increased radiant intensity 114 occurs at angles greater than ±60° from film normal N due to a small amount of light escaping from optical film 30 at high angles. However, the drop in intensity at these angles is significant over conventional optical film 10.

For comparison, a merit function can be defined to demonstrate the advantage of the structured optical film of the present invention over conventional structured optical films. The merit function is defined as the ratio of the maximum radiant intensity (at 0°, or, along film normal N) to the radiant intensity at ±75° (i.e., at high glancing angles). As shown in FIG. 5, for conventional structured optical film 10 (plot 100), the radiant intensity at 0° is 0.2985 W/sr, and the radiant intensity at ±75° is 0.051 W/sr. Thus, the merit function is (0.2985 W/sr)/(0.051 W/sr)=5.8529.

For structured optical 30 according to the present invention (plot 110), the radiant intensity at 0° is 0.2953 W/sr, and the radiant intensity at ±75° is 0.026 W/sr. Thus, the merit function is (0.2953 W/sr)/(0.026 W/sr)=11.358. While peak radiant intensity 112 is slightly less than peak radiant intensity 102, the radiant intensity at ±75° in optical film 30 is nearly half the radiant intensity at +75° in optical film. Thus, the decrease in high angle light rays output from a structured optical film according to the present invention is significant.

Figure 6:
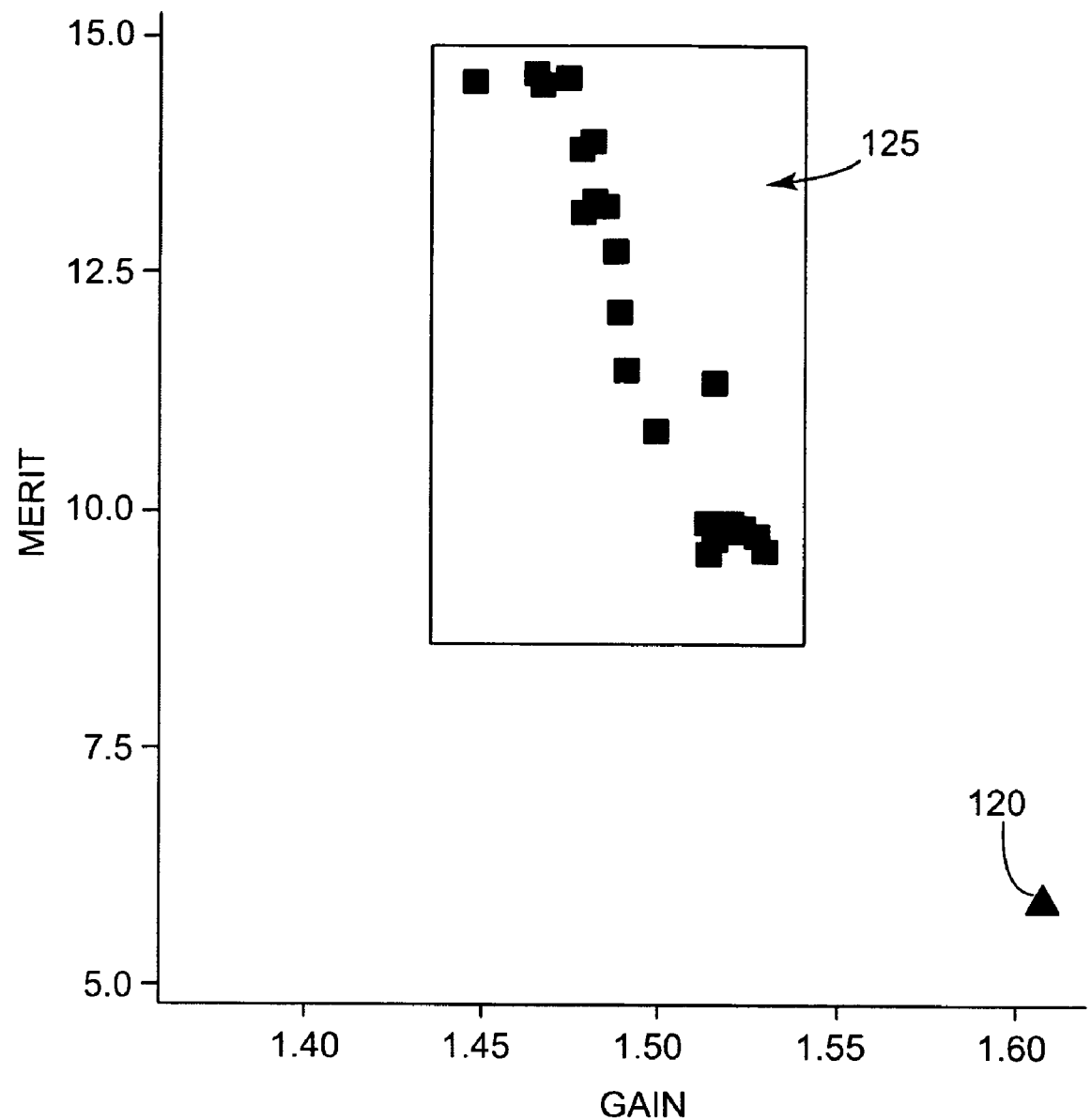
FIG. 6 is a scatter plot of merit function versus gain of a conventional structured optical film and an optical film according to the present invention.

For further comparison, FIG. 6 is a scatterplot of merit function versus gain of conventional structured optical film 10 and optical film 30 according to the present invention. As stated above, gain refers to the ratio of the on-axis brightness (that is, the brightness in a direction normal to the display) of a backlit display equipped with a brightness enhancing film to the on-axis brightness of the display in the absence of the film.

As described with regard to FIGS. 1A and 1B, conventional structured optical film 10 has an included angle $\alpha_P$. Scatterplot 120 is for optical film 10 having prisms 16 with an included angle $\alpha_P$ of 90° and sharp peaks 19. As determined above, structured optical film 10 with this configuration has a merit function of 5.8529. Furthermore, structured optical film 10 with this configuration has a gain of about 1.61. This point is plotted in FIG. 6 as scatterplot 120.

The remaining scatterplots 125 in FIG. 6 show the merit function versus gain for a structured optical film 30 according to the present invention. To produce scatterplots 125, included angle $\theta_P$ of structured optical film 30 was varied, which resulted in variations of the merit function and gain of optical film 30. Included angle $\theta_S$ of prisms 36 and included angle $\theta_B$ of prisms 38 were maintained at 90°, and radius of curvature $r_C$ was maintained at 6 µm. As can be seen, while the gain is slightly decreased due to the variation of the shape of prisms 38, the increase in merit function is very significant compared to conventional structured optical film 10. In other words, the relative decrease in radiant intensity at high glancing angles (i.e., at angles greater than ±75°) is significant over conventional structured optical film 10 at a minimal loss in gain and in intensity along the film normal. This can improve contrast and increase brightness of the display at preferred viewing angles as a consequence of reducing high angle outputs.

In summary, conventional optical films allow some light to exit an optical display outside the allowable range of angles relative to the normal axis running through the display. These high angle light rays produce undesirable areas of brightness outside of a preferred viewing angle that detract from potential additional brightness within the preferred viewing angle and may reduce the contrast of the display. The present invention is a brightness enhancement article for recycling these high angle light rays back to the structured film for retransmission within the range of desired angles. The brightness enhancement article has a structured surface including a plurality of light directing protrusions. Preferably, the structured surface includes a plurality of first light directing protrusions and a plurality of second light directing protrusions. Each of the first light directing protrusions has a first height and produces a light distribution having high angle lobes and lobes generally normal to the structured surface. The second light directing protrusions are positioned with respect to the first light directing protrusions. Each of the second light directing protrusions has a second height greater than the first height and a shape which redirects light distributed by the first light directing protrusions in the high angle lobes. Furthermore, the second light directing protrusions have a shape such that light rays that reach the second light directing protrusions directly from the backlight assembly at undesirable angles are more likely to be reflected back toward the backlight assembly, rather than being transmitted from the optical film at a high glancing angle.

Although the present invention has been described with reference to preferred embodiments, workers skilled in the art will recognize that changes may be made in form and detail without departing from the spirit and scope of the invention.

The invention claimed is:

1. A brightness enhancement article for use in an optical system, the brightness enhancement article having a structured surface comprising:

a plurality of first light directing protrusions, the first light directing protrusions including a peak and a base, the peak having a rounded contour defined by a first pair of prism facets and the base defined by a second pair of prism facets, wherein the first pair of prism facets has a first included angle and the second pair of prism facets has a second included angle, and wherein the first included angle is different than the second included angle.

2. The brightness enhancement article of claim 1, wherein the first included angle is greater than 90° and the second included angle is about 90°.

3. The optical display assembly of claim 1, wherein the peak has a radius of curvature of less than about 10.5 µm.

4. The brightness enhancement article of claim 1, wherein the structured surface is made of a material with a refractive index greater than about 1.5.

5. The brightness enhancement article of claim 1, further comprising:

a plurality of second light directing protrusions of lesser height than the first light directing protrusions, the second light directing protrusions interleaved with the first light directing protrusions and producing a light distribution having high angle lobes and lobes at preferred angles relative to a normal to the structured surface, wherein light distributed by the second light directing protrusions in the high angle lobes is redirected by the first light directing protrusions for retransmission at a preferred angle.

6. The brightness enhancement article of claim 5, wherein the second light directing protrusions are interleaved periodically with the first light directing protrusions.

7. The brightness enhancement article of claim 5, wherein at least one second light directing protrusion is positioned between adjacent first light directing protrusions.

8. The brightness enhancement article of claim 5, wherein the first included angle is greater than 90° and the second included angle is about 90°.

9. The brightness enhancement article of claim 5, wherein each of the second light directing protrusions includes a peak defined by two prism facets having an included angle of about 90°.

10. The brightness enhancement article of claim 5, wherein a truncation height of the second pair of prism facets is substantially similar to the height of the plurality of second light directing protrusions.

11. The brightness enhancement article of claim 5, wherein the structured surface is made of a material with a refractive index greater than about 1.5.

12. The brightness enhancement article of claim 5 wherein the first protrusions have heights at least 1.5 times the heights of the second protrusions.

13. The brightness enhancement article of claim 12 wherein the first protrusions have heights at least twice times the heights of the second protrusions.

14. The brightness enhancement article of claim 13 wherein the first protrusions have heights at least three times the heights of the second protrusions.

15. The brightness enhancement article of claim 1 wherein there is no land between the protrusions.

16. A brightness enhancement article for use in an optical system having a backlight source, the brightness enhancement article having a structured surface facing away from the backlight assembly and having a plurality of light directing protrusions shaped to substantially eliminate light distribution lobes at angles greater than about 75° from an axis normal to the brightness enhancement article, wherein the plurality of light directing protrusions comprises:

a plurality of small prisms, each small prism producing a light distribution having lobes greater than about 75° from the axis normal to the major plane defined by the brightness enhancement article and lobes at preferred angles relative to the axis normal to the major plane defined by the brightness enhancement article; and a plurality of large prisms periodically interleaved with the small prisms, each e large prism including a top portion and a bottom portion, the top portion defined by first and second prism facets, wherein the first and second prism facets have an included angle of greater than 90°, and wherein the large prisms are positioned relative to small prisms such that the light distributed by the small prisms in the lobes greater than 75° is redirected by the top portions of the large prisms.

17. The brightness enhancement article of claim 16, wherein the first and second prism facets is integral with the third and forth prism facets.

18. The brightness enhancement article of claim 16, wherein the peak top portion has a rounded contour.

19. The brightness enhancement article of claim 16, wherein the small prisms have a height which is less than 30% a height of the large prisms.

* * * * *

UNITED STATES PATENT AND TRADEMARK OFFICE
CERTIFICATE OF CORRECTION

PATENT NO. : 7,384,173 B2
APPLICATION NO. : 11/027172
DATED : June 10, 2008
INVENTOR(S) : Leland R. Whitney It is certified that error appears in the above-identified patent and that said Letters Patent is hereby corrected as shown below:

Column 4,
Line 19, delete "lcd" and insert -- LCD --, therefor.
Line 41, delete "ht," and insert -- $h_t$, --, therefor.
Line 42, delete "ht" and insert -- $h_t$ --, therefor.

Column 8,
Delete "+75°" and insert -- ±75° --, therefor.

Column 10,
Line 19, In Claim 5, delete "the structured surface," and insert -- a major plane defined by the brightness enhancement article --, therefor.
Line 57, In Claim 16, delete "source," and insert -- assembly, --, therefor.
Line 62, In Claim 16, after "to" insert -- a major plane defined by --.

Column 12,
Line 3, In Claim 17, delete "forth" and insert -- fourth --, therefor.
Line 5, In Claim 17, after "the" delete "peak".

Signed and Sealed this

Eighteenth Day of May, 2010

David J. Kappos
*Director of the United States Patent and Trademark Office*